United States Patent
Edpalm et al.

(10) Patent No.: US 11,610,282 B2
(45) Date of Patent: Mar. 21, 2023

(54) ALIGNING DIGITAL IMAGES

(71) Applicant: Axis AB, Lund (SE)

(72) Inventors: Viktor Edpalm, Lund (SE); Song Yuan, Lund (SE); Johan Förberg, Lund (SE); Viktors Jakovels, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/313,221

(22) Filed: May 6, 2021

(65) Prior Publication Data

US 2021/0383501 A1    Dec. 9, 2021

(30) Foreign Application Priority Data

Jun. 9, 2020    (EP) .................................... 20179049

(51) Int. Cl.
*G06T 3/00* (2006.01)
*G06T 7/55* (2017.01)
(Continued)

(52) U.S. Cl.
CPC .......... *G06T 3/0068* (2013.01); *G06T 3/4038* (2013.01); *G06T 7/55* (2017.01); *H04N 5/2258* (2013.01); *H04N 5/23238* (2013.01)

(58) Field of Classification Search
CPC ....... G06T 2200/32; G06T 2207/10012; G06T 3/0068; G06T 3/4038; G06T 7/55; G06T 7/73; H04N 5/2258; H04N 5/23238
See application file for complete search history.

(56) References Cited

U.S. PATENT DOCUMENTS 9,973,694 B1    5/2018 van Hoff et al.
10,964,034 B1 * 3/2021 Cook ........................ G06T 7/30
(Continued)

FOREIGN PATENT DOCUMENTS

CN    106797459 A    5/2017
TW    I613905 B    2/2018
(Continued)

OTHER PUBLICATIONS

Extended European Search Report dated Sep. 22, 2020 for European Patent Application No. 20179049.0.
(Continued)

*Primary Examiner* — James T Boylan
(74) *Attorney, Agent, or Firm* — Volpe Koenig

(57) ABSTRACT

A digital camera and a method for aligning digital images comprising: receiving images including first and second images depicting a first and a second region of a scene, the regions being overlapping and displaced along a first direction; aligning the images using a transformation; determining disparity values for an overlap between the images; identifying misalignments by identifying blocks of pixels in the first image having a same position along a second direction and having disparity values exhibiting a variability lower than a first threshold and exhibiting an average higher than a second threshold; adjusting the transformation for the identified blocks of pixels in the first image and their matching blocks of pixels in the second image; and realigning the images using the adjusted transformation.

14 Claims, 3 Drawing Sheets

(51) Int. Cl.
*G06T 3/40* (2006.01)
*H04N 5/225* (2006.01)
*H04N 5/232* (2006.01)

(56) References Cited

U.S. PATENT DOCUMENTS

| | | | | |
|---|---|---|---|---|
| 2006/0193511 | A1* | 8/2006 | Kimura | G06V 20/58 |
| | | | | 382/104 |
| 2011/0199458 | A1 | 8/2011 | Hayasaka et al. | |
| 2015/0341557 | A1 | 11/2015 | Chapdelaine-Couture et al. | |
| 2016/0028950 | A1 | 1/2016 | Perazzi et al. | |
| 2016/0088280 | A1* | 3/2016 | Sadi | G03B 35/08 |
| | | | | 348/48 |
| 2016/0305785 | A1* | 10/2016 | Nishijima | G06V 20/588 |
| 2017/0032517 | A1* | 2/2017 | Akasaka | B60R 1/00 |
| 2017/0256059 | A1* | 9/2017 | Tosic | G06T 7/11 |
| 2018/0262685 | A1* | 9/2018 | Meier | G06T 7/55 |
| 2018/0343431 | A1* | 11/2018 | Veldandi | H04N 13/207 |

FOREIGN PATENT DOCUMENTS

| | | |
|---|---|---|
| TW | 202020815 A | 6/2020 |
| WO | 2010/151049 A2 | 12/2010 |

OTHER PUBLICATIONS

Zhu et al., "An efficient method for geo-referenced video mosaicing for environmental monitoring," Mach. Vis. Appl . . . 16. 203-216 (2005).
Lo et al., "Image Stitching for Dual Fisheye Cameras," 2018 25th IEEE International Conference on Image Processing (ICIP), pp. 3164-3168, (2018).
Novelty Search performed by UppdragsHuset (Feb. 13, 2020).

* cited by examiner

ALIGNING DIGITAL IMAGES

TECHNICAL FIELD

The present invention relates to a method for aligning digital images. It further relates to a digital camera configured to align digital images.

BACKGROUND

Panoramic imaging is a well-known technique for producing images that have an enlarged field of view of a depicted scene. In this technique, multiple images captured by a camera are combined and stitched into a single panoramic image.

A common issue in panoramic imaging of a scene is related to parallax. The scene is usually depicted by a camera from different positions and/or directions, which manifests as an apparent shift of the position of an object in different images. An approach when combining multiple images into a panoramic image may be to minimize the parallax at a certain distance, for example at the distance to an area of interest in the scene. This allows misalignments between the multiple images to be reduced for this area in the scene. However, as scenes typically are three-dimensional, they may include features at other distances as well for which the parallax is not minimized. This may result in misalignments between the multiple images for these distances, which may, in turn, result in a panoramic image having a questionable quality. For example, it may be apparent to a user that the panoramic image is captured using multiple cameras, instead of a single camera which is an aim of this technique. This effect may be seen for objects that are closer to the camera producing the panoramic image. For example, straight lines close to the camera may typically be misaligned in the panoramic image thereby reducing the quality of the panoramic image. Misalignments in the panoramic image may also be problematic in case the panoramic image is used for, e.g., object detection, image-content analysis or other automatic image processing algorithms.

SUMMARY

Mitigating, alleviating or eliminating one or more of the above-identified deficiencies in the art and disadvantages singly or in any combination would be beneficial.

According to a first aspect, a method for aligning digital images is provided. The method comprising: receiving digital images including a first digital image depicting a first region of a scene and a second digital image depicting a second region of the scene, the first and the second regions being overlapping and displaced along a first direction; aligning the digital images using a transformation, wherein the first and the second digital images overlap; determining disparity values for an overlap between the first and the second digital images, each disparity value for the overlap being indicative of a relative displacement along a second direction, which is perpendicular to the first direction, between a block of pixels in the first digital image and a matching block of pixels in the second digital image; identifying misalignments between the digital images by identifying blocks of pixels in the first digital image having a same position along the second direction and having a distribution of disparity values exhibiting a variability lower than a first predetermined threshold and exhibiting an average higher than a second predetermined threshold; adjusting the transformation for the identified blocks of pixels in the first digital image and their matching blocks of pixels in the second digital image; and realigning the digital images using the adjusted transformation to compensate for the identified misalignments.

It has been found that rows or columns (depending on the direction of displacement between the first and second regions in the scene) that exhibit a consistently high average disparity may be misaligned. Thus, misalignments between the digital images may be identified as rows/columns of blocks of pixels in the first digital image for which the disparity values vary to a low degree (relative to the first predetermined value) and has a high average value (relative to the second predetermined value). A correctly aligned row/column may have a low average disparity indicating that matching blocks of pixels of the digital images may have substantially the same position (along the first and the second direction) in the overlap between the digital images. Further, rows/columns that exhibit a high average disparity that also varies to a large degree (e.g., relative to the first predetermined value) may correspond to features in the scene that varies in depth (i.e., varying distance from the camera), and such rows/columns may therefore be correctly aligned. Thereby, by identifying misalignments between the digital images and compensating for them, a reproduction of a scene which is more in line with the actual depicted scene is allowed. Further, realigning the digital images may allow for enhanced image processing (e.g., object detection) of the digital images.

The wording "disparity value" should be construed as a value indicating a degree to and a direction in which a block of pixels and its matching block of pixels are shifted between two digital images.

The wording "block of pixels" should be construed as one or more pixels of a digital image. Hence, a block of pixels may be a single pixel or multiple pixels (e.g., a macroblock) of a digital image. It is to be understood that the block of pixels may be determined based on the algorithm used to determine the disparity values. For example, a block of pixels may be a single pixel in case the disparity values are determined on a pixel level.

The method may further comprise: stitching the realigned digital images, thereby forming a stitched digital image.

Thereby a stitched digital image depicting a scene which is more in line with the actual scene may be allowed.

The transformation for the identified blocks of pixels in the first digital image and their matching blocks of pixels in the second digital image may be adjusted based on the disparity values associated with those blocks of pixels.

Thus, a local adjustment of the transformation, and hence of the digital images, may be allowed. This may reduce an effect of the adjusted transformation on other parts (i.e., blocks of pixels not being identified as misaligned) of the digital images. The realigned digital images may thereby provide an enhanced representation of the scene more in line of the actual depicted scene.

The transformation may comprise a projection of the digital images onto a common projection surface at a projection distance; and the step of adjusting the transformation may comprise locally adjusting the projection distance for the identified blocks of pixels in the first digital image and their matching blocks of pixels in the second digital image such that the relative displacements along the second direction for those blocks of pixels are reduced.

Thus, a local adjustment of the transformation, and hence of the digital images, may be allowed. This may reduce an effect of the adjusted transformation on other parts (i.e., blocks of pixels not being identified as misaligned) of the digital images. The realigned digital images may thereby provide an enhanced representation of the scene more in line of the actual depicted scene.

The step of receiving the digital images may comprise capturing the digital images, and the first and second digital images may be captured simultaneously.

Thereby, the first and the second digital image each depicts the scene at the same point in time. Hence, moving object (e.g., vehicles) may be depicted in the first and the second digital image at the same position within the actual scene. This, in turn, may allow for an improved alignment between the digital images.

The step of receiving the digital images may comprise: capturing the first digital image using a first image sensor; and capturing the second digital image using a second image sensor.

By capturing the first and the second digital images using two image sensors, a larger portion of the scene may be depicted by the digital images.

The transformation may be based on a relative distance between the first and second image sensors and/or a relative orientation of the first and second image sensors.

Thereby, a good starting point for aligning the digital images may be provided, whereby a level of computational resources needed when aligning the digital images may be reduced.

The transformation may be a homography.

A homography may provide a good alignment of the digital images, whereby a level of computational resources associated with aligning the digital images may be reduced. It may be further appreciated that the homography may be predetermined, whereby the level of computational resources needed when aligning the digital images may be further reduced.

The first direction may be parallel to a horizontal direction and the second direction may be parallel to a vertical direction. Hence, misalignments of features elongated along the horizontal direction (e.g., horizontal lines in the scene) may thereby be identified and subsequently compensated for.

The digital images may further include a third digital image depicting a third region of the scene, the first and third regions may be overlapping and may be displaced along the first direction; wherein, after the step of aligning the digital images, the first and third digital images may overlap; wherein the disparity values may be further determined for a further overlap between the first and the third digital image, each disparity value for the further overlap may be indicative of a relative displacement along the second direction between a block of pixels in the first digital image and a matching block of pixels in the second or the third digital image; and the transformation may be further adjusted for the identified blocks in the first digital image and their matching blocks of pixels in the third digital image. The step of receiving the digital images may comprise capturing the third image using a third image sensor.

By using more than one overlap when identifying misalignments between the digital images, a risk of incorrectly identifying misalignments may be reduced. For example, a disparity distribution for a row/column in one overlap may, on its own, exhibit an average and a variability that may (incorrectly) be identified as a misalignment, and when including the further overlap, the disparity distribution (now comprising disparity values for both the overlap and the further overlap) for the row/column exhibits an average and a variability that may (correctly) be identified as not being a misalignment. Put differently, for a misalignment to be identified, it may need to be present in both the overlap and the further overlap. Thereby the identification of misalignments may be improved and may in turn allow the scene depicted by the realigned digital images to be more in line with the actual scene.

It may be further appreciated that by the digital images further including a third digital image, a larger portion of the scene may be depicted.

According to a second aspect, a digital camera is provided. The digital camera comprises: at least one image sensor configured to capture digital images including a first digital image depicting a first region of a scene and a second digital image depicting a second region of the scene, the first and second regions of the scene being overlapping and displaced along a first direction; and circuitry configured to execute: an alignment function configured to align the digital images using a transformation such that the first and second digital images have an overlap, a disparity function configured to determine disparity values for the overlap between the first and the second digital images, each disparity value for the overlap being indicative of a relative displacement along a second direction, which is perpendicular to the first direction, between a block of pixels in the first digital image and a matching block of pixels in the second digital image, a misalignment function configured to identify misalignments between the digital images by identifying blocks of pixels in the first digital image having a same position along the second direction and having a distribution of disparity values exhibiting a variability lower than a first predetermined threshold and exhibiting an average higher than a second predetermined threshold, an adjustment function configured to adjust the transformation for the identified blocks of pixels in the first digital image and their matching blocks of pixels in the second digital image, and a realignment function configured to realign the digital images using the adjusted transformation to compensate for the identified misalignments.

The above-mentioned features of the first aspect, when applicable, apply to this second aspect as well. In order to avoid undue repetition, reference is made to the above.

The circuitry may be further configured to execute: a stitching function configured to stitch the realigned digital images, thereby forming a stitched image.

The alignment function may be further configured to project the digital images onto a common projection surface; and the adjustment function may be further configured to locally adjust the projection distance for the identified blocks of pixels in the first digital image and their matching blocks of pixels in the second digital image.

The at least one image sensor may comprise a first image sensor configured to capture the first digital image and a second image sensor configured to capture the second digital image.

According to a third aspect, a non-transitory computer-readable storage medium is provided. The non-transitory computer-readable storage medium comprises program code portions that, when executed on a device having processing capabilities, perform the method according to the first aspect.

The above-mentioned features of the first aspect and the second aspect, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating preferred variants of the present concepts, are given by way of illustration only, since various changes and modifications within the scope of the concepts will become apparent to those skilled in the art from this detailed description.

Hence, it is to be understood that this concepts are not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present concepts will now be described in more detail, with reference to appended drawings showing different variants. The figures should not be considered limiting the concepts to the specific variant; instead they are used for explaining and understanding the concepts.

As illustrated in the figures, the sizes of layers and regions are exaggerated for illustrative purposes and, thus, are provided to illustrate the general structures of variants of the present concepts. Like reference numerals refer to like elements throughout.

DETAILED DESCRIPTION

The present concepts will now be described more fully hereinafter with reference to the accompanying drawings, in which currently preferred variants of the concepts are shown. These concepts may, however, be implemented in many different forms and should not be construed as limited to the variants set forth herein; rather, these variants are provided for thoroughness and completeness, and fully convey the scope of the present inventive concepts to the skilled person.

Figure 1:
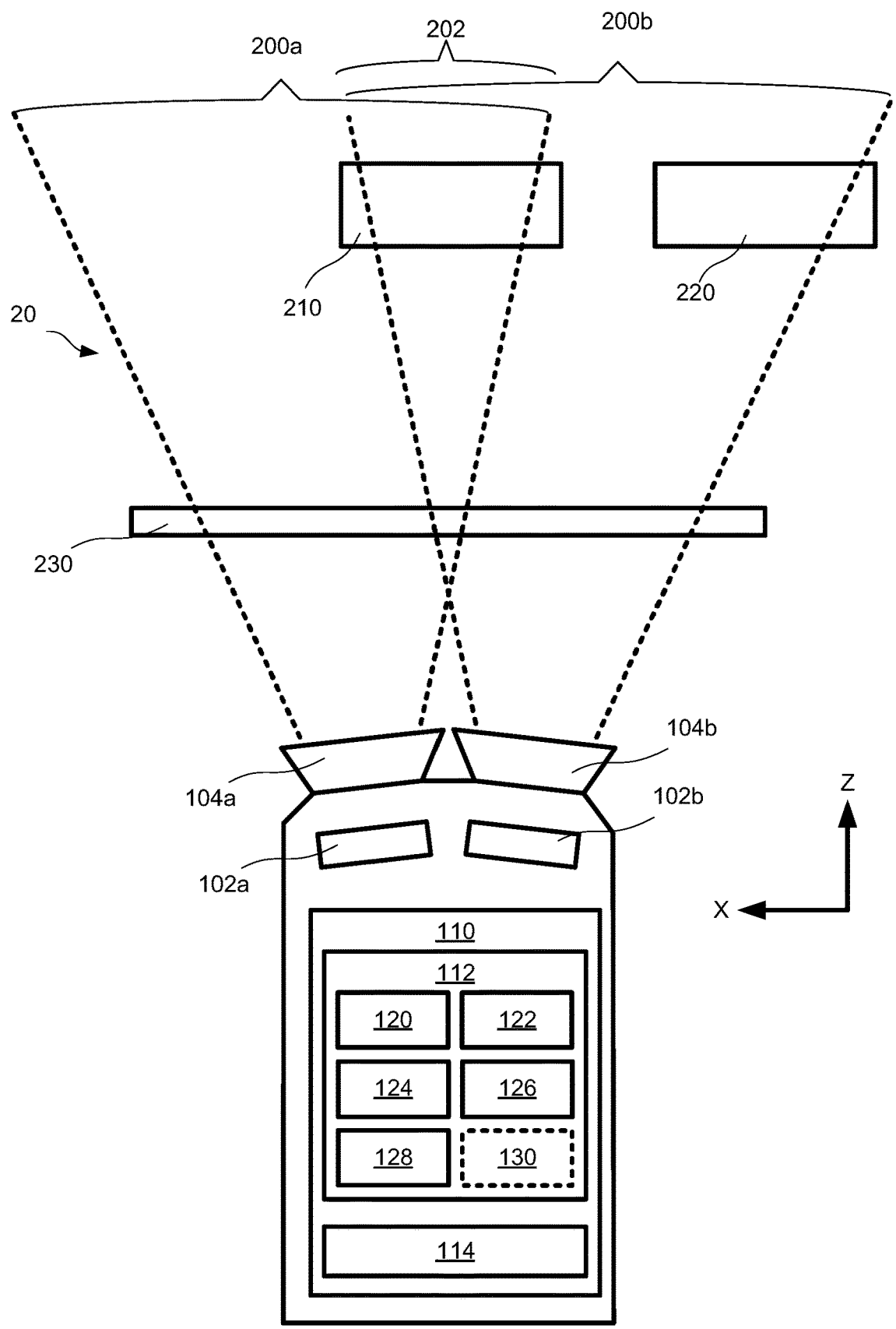
FIG. 1 illustrates an example scenario in which a digital camera depicts a scene.

In the following, a method 30 for aligning digital images will be described with reference to an example scenario illustrated in FIG. 1 and FIGS. 2A-C, and a flow chart illustrated in FIG. 3. In FIG. 1, a digital camera 10 is arranged to produce a panoramic image of a scene 20. The digital camera 10 in FIG. 1 comprises a first image sensor 104a and a second image sensor 104b. It is appreciated that the present concepts may be applied to digital cameras comprising a single image sensor or more than two image sensors, provided that the digital camera can capture at least two digital images that are displaced along a first direction (e.g., along horizontal direction). This may, e.g., be achieved by using a camera comprising two or more image sensors configured to depict different regions of a scene. Alternatively, a camera comprising a single image sensor configured to depict different regions of the scene may be used. Such camera may, e.g., rotate about its own axis and/or comprise imaging optics (e.g., camera lenses) configured to image different portions of the scene onto the single image sensor. It is further appreciated that, even though the present concepts will be described with reference to a digital camera, they may be implemented in a device without imaging capabilities, e.g., a computer. In such case, the computer may receive S300 digital images from a different device, e.g., a camera and/or a computer-readable storage medium.

Now turning to FIG. 1, which illustrates the digital camera 10 and a scene 20 depicted by the digital camera 10. The scene 20 illustrated in FIG. 1 comprises a first building 210, a second building 220, and a wall 230. The first building 210 and the second building 220 are positioned at a larger distance along a direction Z from the digital camera 10 than the wall 230. The scene 20 shown in FIG. 1 may be represented by a coordinate system, where the position of the camera 10 may correspond to the origin of the coordinate system. The first and the second image sensor 102a, 102b each have a position in the scene 20 that may correspond to a respective position relative to the origin of the coordinate system. Further, the first building 210, the second building 220, and the wall 230 each have a position in the scene 20 that may correspond to a respective position relative the origin of the coordinate system.

As is shown in FIG. 1, the first camera lens 104a is configured to image a first region 200a of a scene 20 on the first image sensor 102a, and the second camera lens 104b is configured to image a second region 200b of the scene 20 on the second image sensor 102b. In this example, the first and second image sensors 102a, 102b depict the scene 20 from different directions, and therefore the first and second regions 200a, 200b are displaced along a horizontal direction X. The horizontal direction X may be perpendicular to the distance Z. As is further seen in FIG. 1, a field-of-view (FOV) associated with the first image sensor 102a partially overlaps a FOV associated with the second image sensor 102b, and the first region 200a and the second region 200b therefore have an overlapping portion 202. The first image sensor 102a is configured to capture S320 a first digital image 40a depicting the first region 200a of the scene 20, and the second image sensor 102b is configured to capture S322 a second digital image 40b depicting the second region 200b of the scene 20. The first and the second image sensors 102a, 102b may be configured to capture S318 digital images simultaneously. As is shown in FIG. 1, the digital camera 10 may further comprise circuitry 110. The circuitry 110 is configured to control one or more functions of the digital camera 10. The circuitry 110 may comprise a non-transitory computer-readable storage medium 112. The circuitry 110 may comprise processing capabilities 114 (e.g., a processing unit). The non-transitory computer-readable storage medium 112 may be configured to store program code portions that, when executed by circuitry 110, performs one or more functions of the digital camera 10. In particular, the non-transitory computer-readable storage medium 112 may store one or more function that will be described later in this example. One or more of the functions of the digital camera 10 may be hardware and/or software implemented. The non-transitory computer-readable storage medium 112 may be further configured to store digital images captured by the digital camera 10 and/or results of any function executed by the circuitry 110. The circuitry 110 may further comprise a data bus (not shown). The circuitry 110 may be configured to communicate internally via the data bus. The circuitry 110 may further be configured to communicate with one or more of the first image sensor 102a, the second image sensor 102b, the first camera lens 104a, and the second camera lens 104b via the data bus.

Figure 2A:
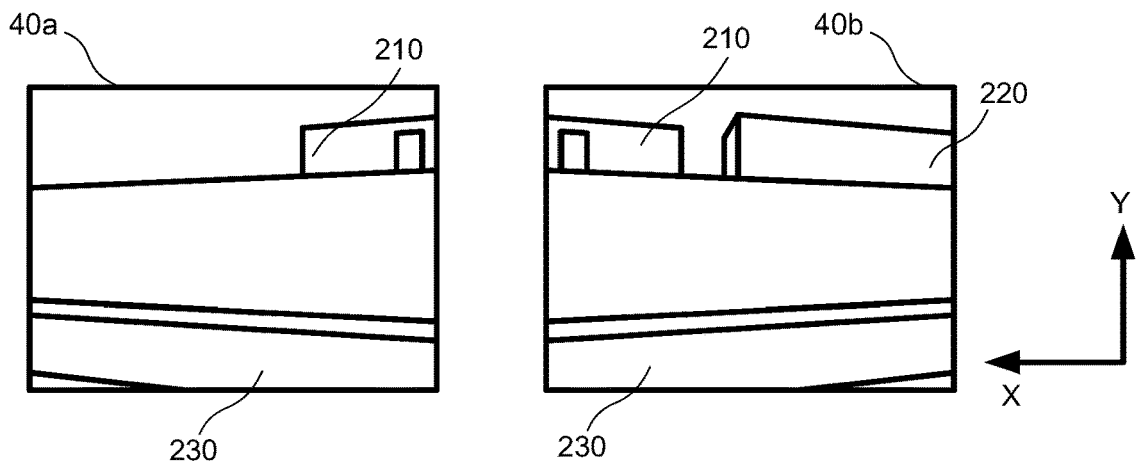
FIG. 2A illustrates a first and a second digital image of the scene captured by the digital camera in FIG. 1.
Figure 3:
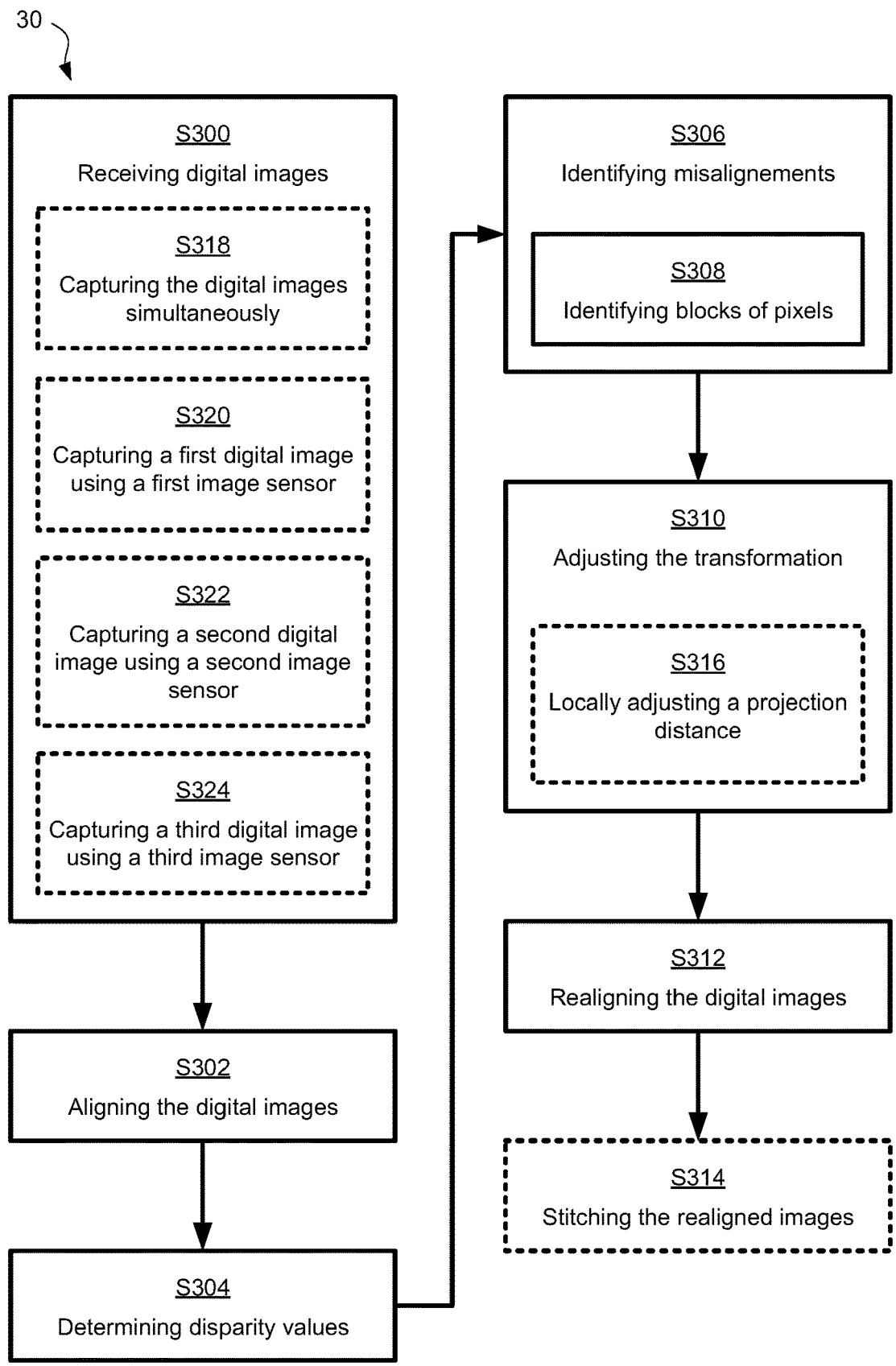
FIG. 3 is a flow chart of a method for aligning digital images.

The first and second digital images 40a, 40b of the scene 10 captured by the camera 10 are illustrated in FIG. 2A. In the first digital image 40a, parts of the first building 210 and the wall 230 is visible. In the second digital image 40b, parts of the first building 210, the second building 220 and the wall 230 are visible. The first and second digital images 40a, 40b appear distorted (e.g., horizontal lines appear slanted), since they image the scene 20 from different directions. A panoramic image of the scene 20 may be produced by stitching the first digital image 40a and the second digital image 40b. In order to produce a panoramic image more in line with the actual scene 20, the first and second digital images 40a, 40b are aligned S302 using a transformation. As in this example, the transformation may be based on a relative distance between the first and the second image sensor 102a, 102b. The transformation may be further based on a relative orientation of the first and the second image sensors 102a, 102b. By knowing the relative positions and relative orientations of the first and the second image sensors 102a, 102b, it may be possible to determine how the first and the second digital images 40a, 40b relate to each other. For example, it may be possible to determine to what extent the first and the second digital images 40a, 40b overlap at a certain distance (in the coordinate system) from the digital camera 10. The alignment is implemented by an alignment function 120 which the circuitry 110 is configured to execute.

Figure 2B:
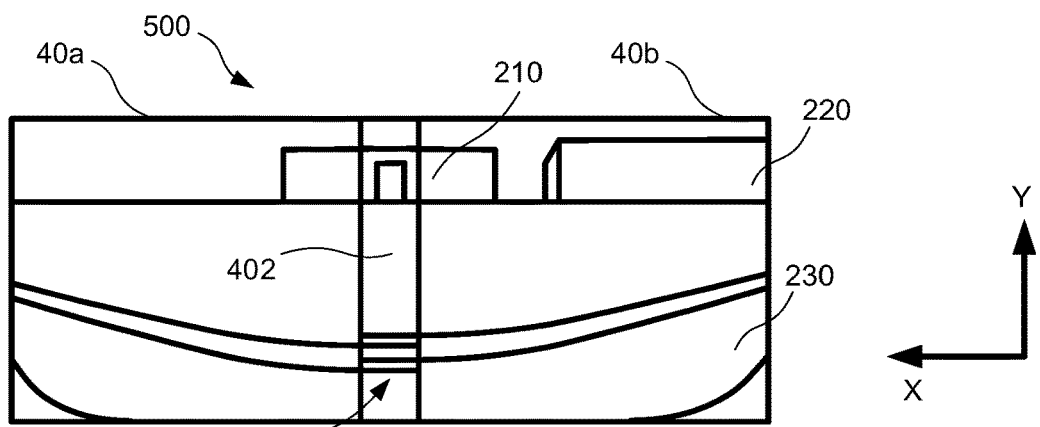
FIG. 2B illustrates the first and second digital images of FIG. 2A when they have been aligned using a transformation.

FIG. 2B illustrates the first and second digital images 40a, 40b when they are aligned using the transformation. As is illustrated in FIG. 2B, the first and the second digital images 40a, 40b overlap, and this overlap 402 corresponds to the overlap 202 between the first and the second region 200a, 200b of the scene 20. In this specific example, the transformation is configured such that the first and second buildings 210, 220 appear non-distorted when the digital images 40a, 40b are aligned using the transformation. Such transformation may comprise projecting the digital images 40a, 40b onto a common projection surface. The common projection surface may be a mathematical plane positioned in the coordinate system, described previously, onto which the digital images 40a, 40b are projected. The common projection surface may be a flat surface as is shown in the example of FIG. 2B. However, a skilled person realizes that the common projection surface may have a different shape, and the common projection surface may, e.g., be a cylindrical surface or a spherical surface. As is known within the art, there are numerous of different projection surfaces that may be used, and which projection surface that is selected may be determined by the positions and/or directions of the image sensors 102a, 102b and their associated FOVs. The common projection surface may be positioned in the coordinate system at a distance corresponding to the distance along Z between the camera 10 and the first and second buildings 210, 220 in the scene 20, whereby misalignments (e.g., due to parallax effects) in the aligned digital images 500 at this distance along Z are at least reduced, or preferably minimized. The position of the common projection surface in the coordinate system may be set manually, e.g., during an installation of the digital camera 10, and/or be set dynamically during a usage of the camera 10. The position of the common projection surface in the coordinate system may be set by a user of the camera 10 and/or be hard-coded into the camera 10. The circuitry 110 may be further configured to execute an analytics function. The analytics function may be configured to detect an object in the scene 20 and a distance between the camera 10 and the detected object, and the alignment function 120 may be configured to set the position of the common projection surface in the coordinate system such that the distance between the origin of the coordinate system (i.e., the position in the coordinate system corresponding to the camera 10) and the common projection surface in the coordinate system corresponds to the distance along Z between the camera 10 and the detected object in the scene 20. The transformation may, e.g., be a homography. The homography may comprise information (e.g., a vector field) of a relation between a position of a block of pixels in the first digital image 40a and a position of a matching block of pixels in the second digital image 40b. However, since the wall 230 is at a smaller distance along Z from the camera 10 than the common projection surface, parts 232 of the wall 230 are misaligned (e.g., due to parallax) in the overlap 402 between the first and the second digital image 40a, 40b.

In order to identify S306 the misalignments, disparity values corresponding to the overlap 402 between the first and the second digital images 40a, 40b are determined S304. In the example shown in FIG. 2B, the misalignments are misaligned horizontal lines (i.e., horizontal features of parts 232 of the wall 230). Each disparity value for the overlap 402 is indicative of a relative displacement along a second direction Y between a block of pixels in the first digital image 40a and a matching block of pixels in the second digital image 40b. A disparity value for the overlap 402 may be determined using one of the techniques known within the art. A disparity value for the overlap 402 may be determined by comparing a block of pixels in the first digital image 40a with blocks of pixels in the second digital image 40b. For instance, the block of pixels in the second digital image 40b along the second direction Y (i.e., having a same position along the first direction X in the second digital image 40b as the block of pixels in the first digital image 40a) that is the best match for the block of pixels in the first digital image 40a may be determined. The comparison of two blocks of pixels may involve calculating a sum of absolute differences (SAD) between pixels values in the blocks. The best matching block of pixels may be the block of pixels that is associated with the smallest SAD. The disparity value may then be determined as a difference between a position along the second direction Y of the block of pixels relative to the first digital image 40a and a position along the second direction Y of the matching block of pixels relative to the second digital image 40b. For example, as seen in the overlap 402 illustrated in FIG. 2B, features associated with the first building 210 have a small (or even non-existent) displacement along the second direction Y. A block of pixels in the first digital image 40a corresponding to a specific feature of the first building 210 and a matching block of pixels (i.e., corresponding to the same specific feature of the first building 210) in the second digital image 40b are displaced to a small (or even non-existent) degree along the second direction Y, and the associated disparity value is therefore small. However, as is seen in FIG. 2B, features 232 associated with the wall 230 have a larger displacement along the second direction Y. A block of pixels in the first digital image 40a corresponding to a specific feature of the wall 230 and a matching block of pixels (i.e., corresponding to the same specific feature of the wall 230) in the second digital image 40b are displaced to a large degree along the second direction Y, and the associated disparity value is therefore large. A disparity value may, e.g., be a number of pixels or blocks of pixels that a feature is displaced along the second direction Y between the first digital image 40a and the second digital image 40b. The disparity values for the overlap 402 between the first and the second digital images 40a, 40b may be represented by a disparity matrix. Each element of the disparity matrix may be a disparity value determined for a position in the first digital image 40a corresponding to the position of the matrix element in the disparity matrix. The determination of disparity values is implemented by a disparity function 122 which the circuitry 110 is configured to execute.

The misalignments between the first and the second digital images 40a, 40b are identified S306 by identifying S308 blocks of pixels in the first digital image 40a having a same position along the second direction Y and having a distribution of disparity values exhibiting a variability lower than a first predetermined threshold and exhibiting an average higher than a second predetermined threshold. In this example, blocks of pixels in the first digital image 40a having the same position along the second direction Y is a row of blocks of pixels in the first digital image 40a. For a row in the first digital image 40a, the associated disparity values are distributed and an average and a variability (e.g., a standard deviation etc.) of these disparity values may be determined. A row in the first digital image 40a is identified as a misalignment in case the variability is lower than the first predetermined value and the average is larger than a second predetermined value. For example, a misalignment may be identified in case a ratio between the average and the variability is larger than a third predetermined value. In other words, a row in the first digital image 40a is identified as a misalignment in case the associated disparity values are relatively high and varies to a relatively low degree compared to the first and the second predetermined threshold. For a misaligned line, as is shown in the example of FIG. 2B, the disparity values will typically be large and exhibit a low variability. In this way, it may be possible to identify misalignments in the overlap 402 between the first and second digital images 40a, 40b. Further, misalignments in the overlap 402 may only be identified for distances smaller than a predetermined maximum distance from the camera 10. The identification of misalignments is implemented by a misalignment function 124 which the circuitry 110 is configured to execute. In this specific case, the rows of the first digital image 40a that corresponds to the parts 232 of the wall 230 are identified as misalignments.

The transformation is adjusted S310 for blocks of pixels associated with the identified misalignments (i.e., the identified blocks of pixels in the first digital image 40a and their matching blocks of pixels in the second digital image 40b). The transformation for the identified blocks of pixels may be adjusted based on the disparity values associated with those blocks of pixels. For example, the transformation may be adjusted by locally adjusting S316 the projection distance for the identified blocks of pixels in the first digital image 40a and their matching blocks of pixels in the second digital image. As discussed previously, parallax effects may be affected, in particular reduced, by the distance to the common projection surface. In this way, the relative displacement along the second direction for those blocks of pixels may be reduced (i.e., reducing the misalignments between the first and the second digital images 40a, 40b). The adjustment of the transformation may be based on an average disparity value associated with the identified blocks of pixels in the first digital image 40a such that the adjustment for a high average disparity value is relatively larger than for a low average disparity value. The adjustment of the transformation based on the average disparity value may be predetermined, for example by a look-up table. The look-up table may comprise information relating average disparity values with adjustments of the transformation. For example, the look-up table may comprise information relating average disparity values with distances which the common projection surface should be adjusted by. Alternatively, or additionally, the transformation may be adjusted iteratively and for each iteration updated disparity values may be determined. The transformation may be adjusted iteratively until an average of the updated disparity values is within a predetermined threshold range. In case the transformation is a homography, the adjustment of the transformation may comprise adjusting, for blocks of pixels associated with the identified misalignments, the vector field describing the transformation. The degree to which the vector field is adjusted may be based on the average disparity value associated with the identified blocks of pixels in the first digital image 40a such that the adjustment for a high average disparity value is relatively larger than for a low average disparity value. The adjustment of the vector field based on the average disparity value may be predetermined, e.g., by a look-up table. The look-up table may comprise information relating average disparity values with adjustments of the vector field. Alternatively, or additionally, the vector field may be adjusted iteratively and for each iteration updated disparity values may be determined. The vector field may be adjusted iteratively until an average of the updated disparity values is within a predetermined threshold range. The adjustment of the transformation is implemented by an adjustment function 126 which the circuitry 110 is configured to execute. The first and the second digital images 40a, 40b are realigned S312 using the adjusted transformation to compensate for the identified misalignments. The realignment is implemented by a realignment function 128 which the circuitry 110 is configured to execute.

Figure 2C:
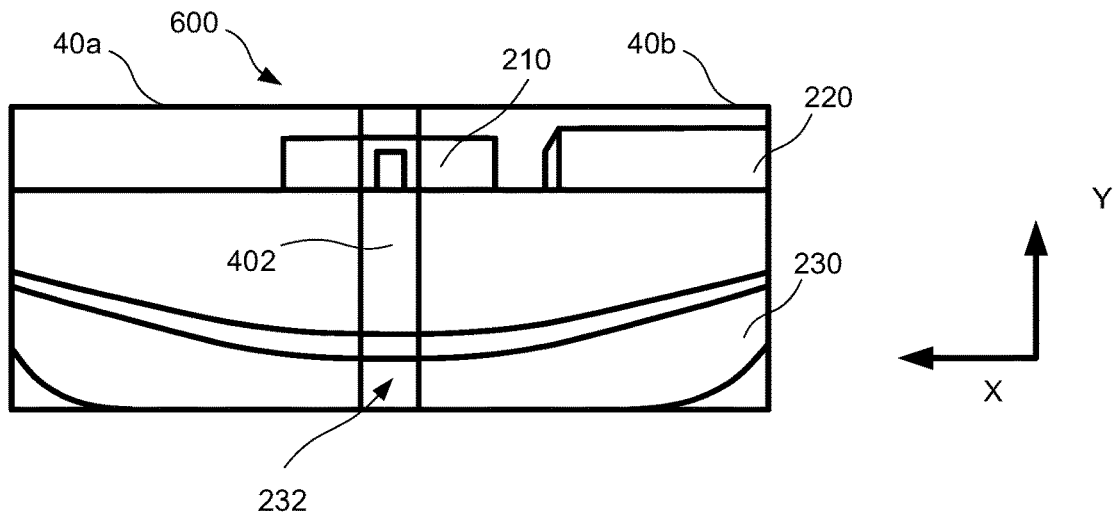
FIG. 2C illustrates the first and second digital images of FIG. 2B when they have been realigned using an adjusted transformation.

FIG. 2C illustrates the first and the second digital images 40a, 40b of FIG. 2B after they have been realigned using the adjusted transformation. As is seen in FIG. 2C, the misalignments have been compensated in the realigned digital images 600, allowing for a combined digital image which is more in line with the actual scene 20. Particularly, the parts 232 of the wall 230 in the overlap 402 are displaced along the second direction Y to a lower degree for the realigned digital images 600 of FIG. 2C as compared with the aligned digital images 500 illustrated in FIG. 2B. The realigned digital images 600 illustrated in FIG. 2C may be stitched S314, thereby forming a stitched image. The stitching may be implemented by a stitching function 130 which the circuitry 110 is configured to execute. The stitched image may be stored on the non-transitory computer-readable storage medium 112.

It may be appreciated that the identification of misalignments may be further enhanced in case more than two digital images are used. For example, a third digital image depicting a third region of the scene 20 may be captured S324 (e.g., by a camera comprising a third image sensor), and the third region may overlap the first region 200a and may be displaced along the horizontal direction X. After aligning the digital images, the first and third digital images may overlap, and disparity values may be further determined for a further overlap between the first and the third digital image. Each disparity value for the further overlap may be indicative of a relative displacement along the second direction Y between a block of pixels in the first digital image and a matching block of pixels in the second or the third digital image, and the transformation may be further adjusted for the identified blocks in the first digital image and their matching blocks of pixels in the third digital image. For this case, it is realized that more data (i.e., disparity values) related to misalignments along, e.g., a row in the first digital image 40a may be available, which in turn may allow for an improved identification of misalignments. As a specific example, consider a row in a first digital image for which an average and a variability of a distribution of associated disparity values for the overlap between the first and the second digital image incorrectly indicates that the row is misaligned. By including a third digital image, the average and the variability of a distribution of associated disparity values for the overlap between the first and the second digital image and for the further overlap between the first and the third digital image may correctly indicate that the row is indeed aligned.

The person skilled in the art realizes that the present concepts by no means are limited to the preferred variants described above. On the contrary, many modifications and variations are possible within the scope of the appended claims.

For example, the present concepts have been described with reference to two digital images being displaced along a horizontal direction. However, a skilled person realizes that, and understands how, the present concepts may be adapted to other configurations of the digital camera. For example, that the digital images may be displaced along the vertical direction or a combination of the vertical and the horizontal direction.

Further, the steps of the method are described to be performed in a certain order. However, it is to be understood that certain steps may be performed in a different order than described. One or more of the steps of the method may further be performed simultaneously.

Additionally, variations to the disclosed variants can be understood and effected by the skilled person in practicing the method, from a study of the drawings, the disclosure, and the appended claims.

The invention claimed is:

1. A computer-implemented method for aligning digital images, comprising:
    receiving digital images including a first digital image depicting a first region of a scene and a second digital image depicting a second region of the scene, the first and the second region being overlapping and displaced along a first direction;
    aligning the digital images using a transformation, wherein the first and the second digital images overlap;
    determining disparity values for an overlap between the first and the second digital images, each disparity value for the overlap being indicative of a relative displacement along a second direction, which is perpendicular to the first direction, between a block of pixels in the first digital image and a matching block of pixels in the second digital image;
    identifying misalignments between the digital images by identifying a line of blocks of pixels in the first digital image having a same position along the second direction and having a distribution of disparity values exhibiting a variability lower than a first threshold and exhibiting an average higher than a second threshold;
    adjusting the transformation for the identified blocks of pixels in the first digital image and their matching blocks of pixels in the second digital image based on the disparity values associated with those blocks of pixels; and
    realigning the digital images using the adjusted transformation to compensate for the identified misalignments.

2. The method according to claim 1, further comprising: stitching the realigned digital images, thereby forming a stitched digital image.

3. The method according to claim 1, wherein the transformation comprises a projection of the digital images onto a common projection surface at a projection distance; and
    wherein the step of adjusting the transformation comprises locally adjusting the projection distance for the identified blocks of pixels in the first digital image and their matching blocks of pixels in the second digital image thereby reducing the relative displacements along the second direction for those blocks of pixels after the step of realigning the digital images.

4. The method according to claim 1, wherein the step of receiving the digital images comprises capturing the digital images, and wherein the first and second digital images are captured simultaneously.

5. The method according to claim 1, wherein the step of receiving the digital images comprises:
    capturing the first digital image using a first image sensor; and
    capturing the second digital image using a second image sensor.

6. The method according to claim 5, wherein the transformation is based on at least one of a relative distance between the first and second image sensors and a relative orientation of the first and second image sensors.

7. The method according to claim 1, wherein the transformation is a homography.

8. The method according to claim 1, wherein the first direction is parallel to a horizontal direction and the second direction is parallel to a vertical direction.

9. The method according to claim 1,
    wherein the digital images further include a third digital image depicting a third region of the scene, the first and third regions being overlapping and displaced along the first direction;
    wherein, after the step of aligning the digital images, the first and third digital images overlap;
    wherein the disparity values are further determined for a further overlap between the first and the third digital images, each disparity value for the further overlap being indicative of a relative displacement along the second direction between a block of pixels in the first digital image and a matching block of pixels in the third digital image; and
    wherein the transformation is further adjusted for the identified blocks in the first digital image and their matching blocks of pixels in the third digital image.

10. A digital camera comprising:
    at least one image sensor configured to capture digital images including a first digital image depicting a first region of a scene and a second digital image depicting a second region of the scene, the first and second regions of the scene being overlapping and displaced along a first direction; and
    circuitry configured to execute:
        an alignment function configured to align the digital images using a transformation such that the first and second digital images have an overlap,
        a disparity function configured to determine disparity values for the overlap between the first and the second digital images, each disparity value for the overlap being indicative of a relative displacement along a second direction, which is perpendicular to the first direction, between a block of pixels in the first digital image and a matching block of pixels in the second digital image, a misalignment function configured to identify misalignments between the digital images by identifying a line of blocks of pixels in the first digital image having a same position along the second direction and having a distribution of disparity values exhibiting a variability lower than a first threshold and exhibiting an average higher than a second threshold, an adjustment function configured to adjust the transformation for the identified blocks of pixels in the first digital image and their matching blocks of pixels in the second digital image based on the disparity values associated with those blocks of pixels, and a realignment function configured to realign the digital images using the adjusted transformation to compensate for the identified misalignments.

11. The digital camera according to claim 10, wherein the circuitry is further configured to execute:

a stitching function configured to stitch the realigned digital images, thereby forming a stitched image.

12. The digital camera according to claim 10, wherein the alignment function is further configured to project the digital images onto a common projection surface at a projection distance; and wherein the adjustment function is further configured to locally adjust the projection distance for the identified blocks of pixels in the first digital image and their matching blocks of pixels in the second digital image, thereby reducing the relative displacements along the second direction for those blocks of pixels after realignment of the digital images.

13. The digital camera according to claim 10, wherein the at least one image sensor comprises a first image sensor configured to capture the first digital image and a second image sensor configured to capture the second digital image.

14. A non-transitory computer-readable storage medium comprising program code portions that, when executed on a device having processing capabilities, perform a method for aligning digital images, comprising:

receiving digital images including a first digital image depicting a first region of a scene and a second digital image depicting a second region of the scene, the first and the second region being overlapping and displaced along a first direction;

aligning the digital images using a transformation, wherein the first and the second digital images overlap;

determining disparity values for an overlap between the first and the second digital images, each disparity value for the overlap being indicative of a relative displacement along a second direction, which is perpendicular to the first direction, between a block of pixels in the first digital image and a matching block of pixels in the second digital image;

identifying misalignments between the digital images by identifying a line of blocks of pixels in the first digital image having a same position along the second direction and having a distribution of disparity values exhibiting a variability lower than a first threshold and exhibiting an average higher than a second threshold;

adjusting the transformation for the identified blocks of pixels in the first digital image and their matching blocks of pixels in the second digital image based on the disparity values associated with those blocks of pixels; and realigning the digital images using the adjusted transformation to compensate for the identified misalignments.

\* \* \* \* \*